(12) United States Patent
Kim et al.

(10) Patent No.: US 10,514,866 B2
(45) Date of Patent: Dec. 24, 2019

(54) DATA STORAGE DEVICE, OPERATING METHOD THEREOF AND METHOD FOR OPERATING NONVOLATILE MEMORY DEVICE

(71) Applicant: SK hynix Inc., Gyeonggi-do (KR)

(72) Inventors: Jin Soo Kim, Gyeonggi-do (KR); Soong Sun Shin, Gyeonggi-do (KR); Han Choi, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/010,942

(22) Filed: Jun. 18, 2018

(65) Prior Publication Data

US 2019/0155543 A1    May 23, 2019

(30) Foreign Application Priority Data

Nov. 23, 2017  (KR) .................. 10-2017-0157430

(51) Int. Cl.
  *G06F 9/44*    (2018.01)
  *G06F 3/06*    (2006.01)
  *G01K 13/00*   (2006.01)

(52) U.S. Cl.
  CPC ........... *G06F 3/0659* (2013.01); *G01K 13/00* (2013.01); *G06F 3/0619* (2013.01); *G06F 3/0653* (2013.01); *G06F 3/0679* (2013.01)

(58) Field of Classification Search
  CPC .... G06F 3/0659; G06F 3/0619; G06F 3/0679; G01K 13/00
  USPC ................................... 365/189.011
  See application file for complete search history.

(56) References Cited

U.S. PATENT DOCUMENTS

| | | | | |
|---|---|---|---|---|
| 9,183,000 | B2 * | 11/2015 | Ichida | G06F 9/448 |
| 2003/0147297 | A1 * | 8/2003 | Shiota | G06F 13/161 |
| | | | | 365/230.03 |
| 2003/0202383 | A1 * | 10/2003 | Shiota | G06F 13/161 |
| | | | | 365/185.33 |
| 2013/0227268 | A1 * | 8/2013 | Ichida | G06F 9/448 |
| | | | | 713/100 |

FOREIGN PATENT DOCUMENTS

KR    1020160137180    11/2016

* cited by examiner

*Primary Examiner* — Xiaochun L Chen
(74) *Attorney, Agent, or Firm* — IP & T Group LLP (57) ABSTRACT

A data storage device includes a nonvolatile memory device configured to have a temperature sensor; and a controller, wherein the nonvolatile memory device performs an operation based on an operation command outputted from the controller, and transmits a temperature information measured by the temperature sensor along with an operation result to the controller.

18 Claims, 8 Drawing Sheets

DATA STORAGE DEVICE, OPERATING METHOD THEREOF AND METHOD FOR OPERATING NONVOLATILE MEMORY DEVICE

CROSS-REFERENCES TO RELATED APPLICATION

The present application claims priority under 35 U.S.C. § 119(a) to Korean application number 10-2017-0157430, filed on Nov. 23, 2017, which is incorporated herein by reference in its entirety.

BACKGROUND

1. Technical Field

Various embodiments of the present disclosure generally relate to a data storage device. Particularly, the embodiments relate to a data storage device including a nonvolatile memory device.

2. Related Art

A data storage device may be configured to store data provided from an external device in response to a write request from the external device. Also, the data storage device may be configured to provide the stored data to the external device in response to a read request from the external device. The external device may be an electronic device capable of processing data such as a computer, a digital camera, or a mobile phone. The data storage device may be built in the external device, or may be manufactured in a separable form and be coupled to the external device.

Since a data storage device using a memory device has no mechanical driving part, various advantages may include excellent stability and durability, high information access speed, and low power consumption. Data storage devices having such advantages include a universal serial bus (USB) memory device, memory cards having various interfaces, a universal flash storage (UFS) device, and a solid state drive (SSD).

SUMMARY

Various embodiments are directed to a data storage device capable of precisely determining a temperature inside a nonvolatile memory device.

In an embodiment, a data storage device may include: a nonvolatile memory device configured to have a temperature sensor; and a controller, wherein the nonvolatile memory device performs an operation based on an operation command outputted from the controller, and transmits a temperature information measured by the temperature sensor along with an operation result to the controller.

In an embodiment, a method for operating a nonvolatile memory device may include: receiving an operation command from a controller; performing an operation based on the operation command; collecting a temperature information based on a temperature measured by a temperature sensor; and outputting an operation result and the temperature information together to the controller.

In an embodiment, a method for operating a data storage device may include: transmitting an operation command to a nonvolatile memory device from a controller; performing an operation in the nonvolatile memory device based on the operation command; collecting a temperature information inside the nonvolatile memory device; and transmitting an operation result and the temperature information together to the controller from the nonvolatile memory device.

In an embodiment, a memory system may include: a memory device suitable for sensing temperature thereof; and a controller suitable for controlling the memory device to provide the controller with a response to an operation command along with the sensed temperature.

The data storage devices according to the embodiments may precisely determine the temperature of a nonvolatile memory device.

Also, the data storage devices according to the embodiments may determine the temperature of a nonvolatile memory device without a separate request and thereby prevent the performances of the data storage devices from degrading.

DETAILED DESCRIPTION

In the present invention, advantages, features, and methods of the present invention will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily understand the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes " and/or "including," when used in this specification, specify the presence of at least one stated feature, step, operation, and/or element, but do not preclude the presence or addition of one or more other features, steps, operations, and/or elements thereof.

The temperature inside a solid state drive, especially, a NAND flash memory device, is closely related to the reliability of the NAND flash memory device secured by reducing the stress of memory cells. In detail, if operations such as a read operation, a write operation, and so forth are repeatedly performed in memory cells, the stress of the NAND flash memory device increases and the temperature of the NAND flash memory device rises. If an operation command is transmitted to a memory cell of which temperature has excessively risen and a corresponding operation is performed, a problem is caused in that the possibility of an error to occur increases.

In this consideration, a temperature sensor may be disposed in the NAND flash memory device, a controller may output a command which requests a temperature information, and in correspondence to this, a temperature measured in the NAND flash memory device may be transferred to the controller. However, in this regard, inefficiency may be caused since the additional operation command is outputted.

Further, a controller may measure an internal temperature thereof, and the temperature of the NAND flash memory device may be indirectly determined by applying a correction value to the temperature of the controller. Nevertheless, in this regard, a temperature that rises or falls due to an operation inside the controller irrelevant to the NAND flash memory device may be reflected to the detection of the NAND flash memory device, and it may be difficult to precisely determine the temperature of the NAND flash memory device and thus unnecessary control of an operation command may be implemented.

Hereinafter, a data storage device, an operating method thereof, and a method for operating a nonvolatile memory device will be described below with reference to the accompanying drawings through various exemplary embodiments.

Figure 1:
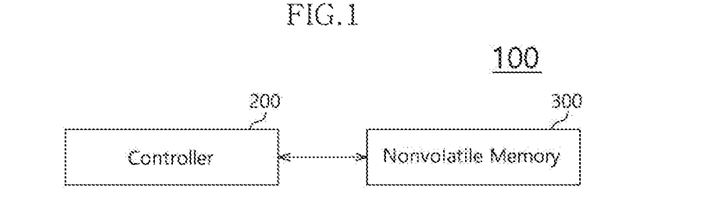
FIG. 1 is a block diagram schematically illustrating a data storage device in accordance with an embodiment of the present disclosure.

FIG. 1 is a block diagram schematically illustrating a data storage device in accordance with an embodiment of the present disclosure.

Referring to FIG. 1, a data storage device 100 may store data to be accessed by a host device (not shown) such as a mobile phone, an MP3 player, a laptop computer, a desktop computer, a game player, a TV, an in-vehicle infotainment system, and so forth. The data storage device 100 may be referred to as a memory system.

The data storage device 100 may be manufactured in any one of various kinds of storage devices according to a host interface, meaning a transmission protocol with respect to the host device. For example, the data storage device 100 may be configured as any one of various kinds of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and so forth.

The data storage device 100 may be manufactured in any one among various kinds of package types. For example, the data storage device 100 may be manufactured in any one of various kinds of package types such as a package-on-package (POP), a system-in-package (SIP), a system-on-chip (SOC), a multi-chip package (MCP), a chip-on-board (COB), a wafer-level fabricated package (WFP), and a wafer-level stack package (WSP).

Figure 2:
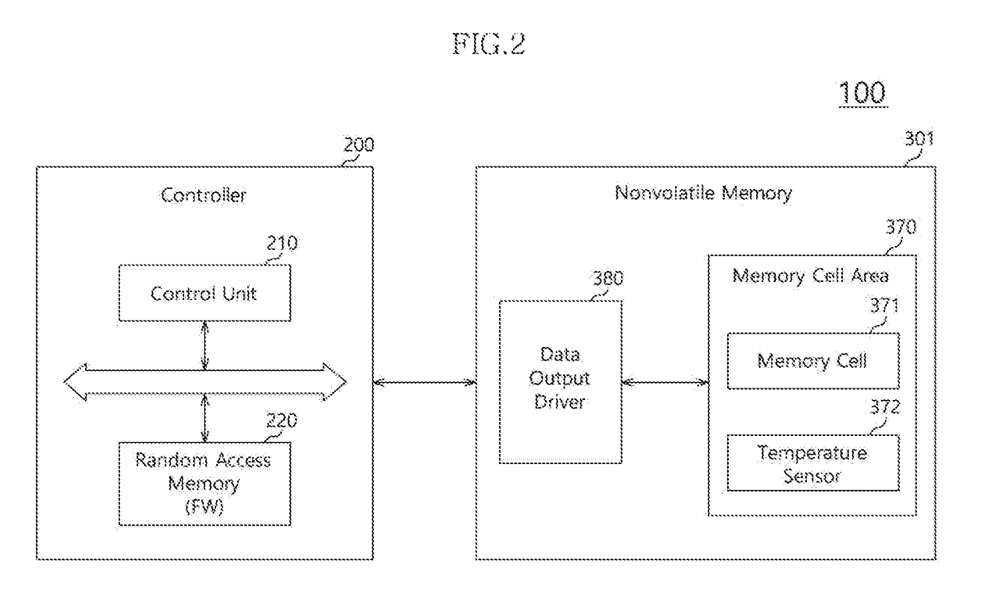
FIG. 2 is a block diagram illustrating a data storage device including a temperature sensor in accordance with an embodiment.
Figure 3:
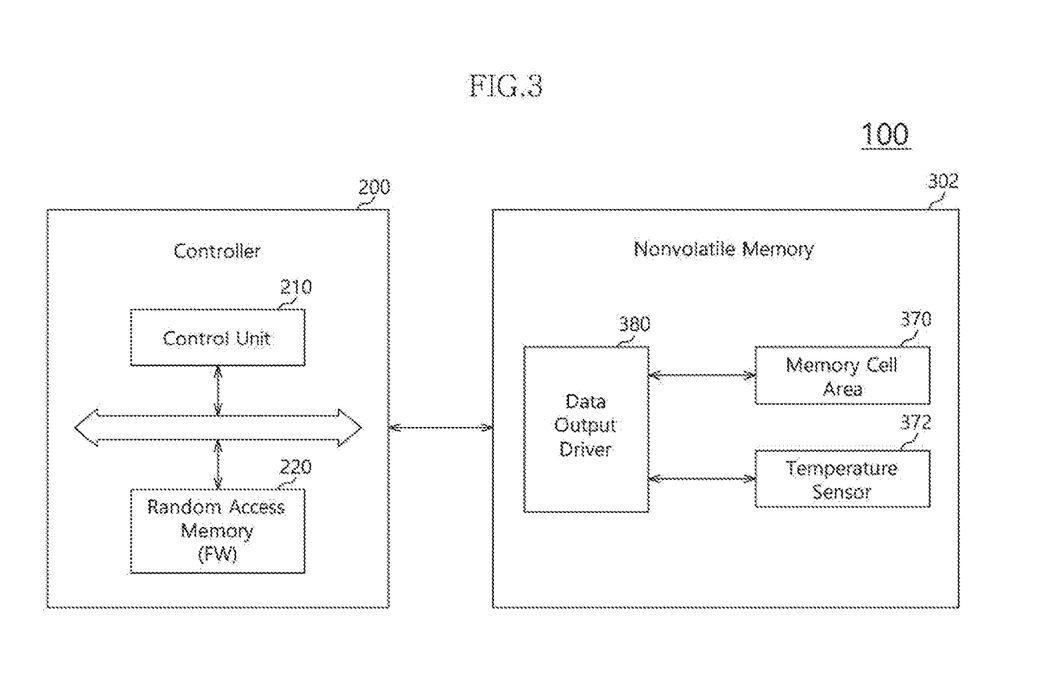
FIG. 3 is a block diagram illustrating a data storage device including a temperature sensor in accordance with an embodiment.

FIG. 2 is a block diagram illustrating a data storage device including a temperature sensor in accordance with an embodiment. FIG. 3 is a block diagram illustrating a data storage device including a temperature sensor in accordance with an embodiment.

Referring to FIGS. 2 and 3, each data storage device 100 in accordance with embodiments may include a controller 200. The controller 200 may include a control unit 210 and a random access memory 220.

The control unit 210 may be configured by a micro control unit (MCU) or a central processing unit (CPU). The control unit 210 may process a request which is transmitted from a host device. In order to process the request, the control unit 210 may drive an instruction or algorithm of a code type, that is, a firmware FW, loaded in the random access memory 220, and may control internal function blocks and a corresponding nonvolatile memory device 301 or 302.

The random access memory 220 may be configured by a random access memory such as a dynamic random access memory (DRAM) or a static random access memory (SRAM). The random access memory 220 may store the firmware FW which is to be driven by the control unit 210. Also, the random access memory 220 may store data necessary for driving the firmware FW, for example, metadata. That is, the random access memory 220 may operate as the working memory of the control unit 210.

The data storage devices 100 in accordance with the embodiments may include the nonvolatile memory devices 300, 301, and 302, each of which is configured to include a temperature sensor 372. Each of the nonvolatile memory devices 300, 301 and 302 may perform an operation based on an operation command outputted from the controller 200 and may transmit to the controller 200 a temperature information measured by the temperature sensor 372 along with a result of the operation.

As shown in FIG. 2, the temperature sensor 372 may be coupled to each of memory cells 371, which are positioned in the nonvolatile memory device 301. The temperature sensor 372 may individually measure the temperature of each of the memory cells 371, or may be positioned in a memory cell area 370 and may measure the temperature of the memory cell area 370 as well as the memory cells 371.

Also, as shown in FIG. 3, the temperature sensor 372 may be positioned in the nonvolatile memory device 302 to measure the temperature of the nonvolatile memory device 302, even if it is not positioned in the memory cell area 370

Each of the nonvolatile memory devices 300, 301, and 302 may include a data output driver 380. The nonvolatile memory device 300, 301, and 302 may be linked with the controller 200 through the data output driver 380 and receive a command outputted from the controller 200, and may transmit informations obtained from the memory cell area 370 and the temperature sensor 372, to the controller 200. Referring to FIG. 2, the data output driver 380 may be linked with the memory cell area 370, and may receive a result of an operation performed in the memory cell 371 and a temperature information measured in the memory cell area 370 and transmit the obtained information to the controller 200.

Referring to FIG. 3, the data output driver 380 may obtain a result of an operation performed in the memory cell area 370, may obtain a temperature information from the temperature sensor 372, and may transmit the obtained informations to the controller 200.

The temperature information measured by the temperature sensor 372 may be transmitted along with a result of an operation performed to the controller 200 by successively transmitting the temperature information and the result of an operation performed. The order in which the temperature information and the result of an operation performed are transmitted is irrelevant. That is, it may be possible to set either the temperature information or the operation result may be transmitted first.

An operation to be performed by each of the data storage devices 100 in accordance with the embodiments may be a write operation. The nonvolatile memory device 300 may transmit information on a write result of performing a write operation and a temperature information together to the controller 200, which may be performed based on a result information request command received from the controller 200. Also, an operation to be performed by each of the data storage devices 100 may be a read operation, and each of the nonvolatile memory devices 300, 301, and 302 may transmit read data along with the temperature information to the controller 200.

In each of the data storage devices 100 in accordance with the embodiments, the controller 200 may output a first command, and each of the nonvolatile memory devices 300, 301, and 302 may transmit a temperature information along with an operation result to the controller 200 each time when an operation command for the operation is received after the first command is received. Through the first command, the controller 200 may request to start an operation of transmitting a temperature information measured in each of the nonvolatile memory devices 300, 301, and 302 along with an operation result to the controller 200.

Further, after an operation in which a temperature information is transmitted along with an operation result is started by the first command, the controller 200 may output a second command, and each of the nonvolatile memory devices 300, 301, and 302 may stop the operation of transmitting a temperature information measured in each of the nonvolatile memory devices 300, 301, and 302 along with an operation result to the controller 200 in response to the second command. Namely, through the second command, the controller 200 may request to stop the operation of transmitting a temperature information measured in each of the nonvolatile memory devices 300, 301, and 302 along with an operation result to the controller 200 in response to the second command.

The data storage device 100 in accordance with each of the embodiments may measure a temperature inside the controller 200, and may output the first command when the temperature inside the controller 200 is equal to or higher than a reference temperature. Moreover, when the number of times by which commands are outputted to each of the nonvolatile memory devices 300, 301, and 302 for a predetermined time is equal to or larger than a reference number of times, the first command may be outputted. A temperature and a number of times by which commands are outputted, as references for outputting the first command, may be set in advance and may be changed at any time.

Figure 4:
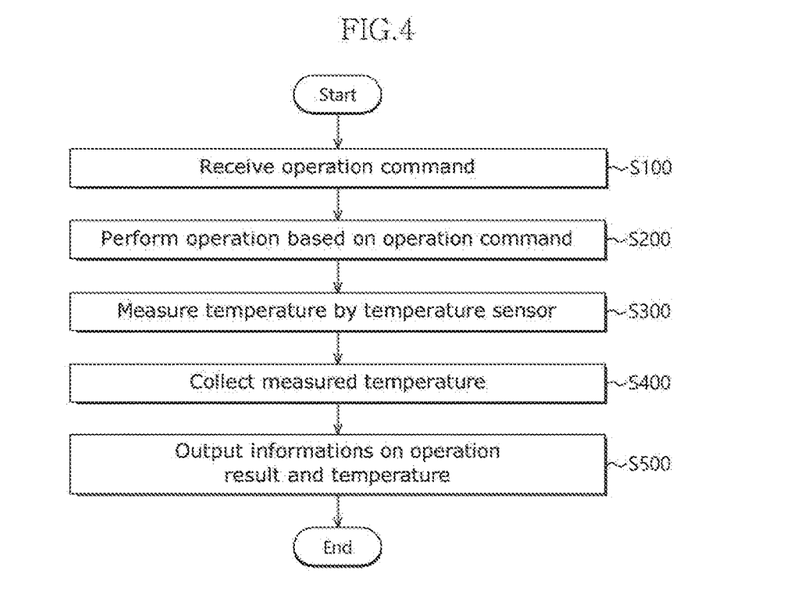
FIG. 4 is a flow chart describing a method for operating a nonvolatile memory device in accordance with an embodiment.

FIG. 4 is a flow chart describing a method for operating a nonvolatile memory device in accordance with an embodiment.

Referring to FIG. 4, the method for operating a nonvolatile memory device in accordance with the embodiment may include a step of receiving an operation command from a controller at step S100, a step of performing an operation based on the operation command at step S200, steps of collecting a temperature information based on a temperature measured by a temperature sensor at steps S300 and S400, and a step of outputting a result of performing the operation along with the temperature information to the controller at step S500.

The step of performing an operation and the steps of collecting a temperature information may be changed in order. That is, a temperature information may be collected first based on a temperature measured by a temperature sensor, and then, an operation may be performed. The fact that a temperature information measured by the temperature sensor may be transmitted "along with" an operation result to the controller may suggest that the temperature information and the operation result are successively transmitted. However, the order in which the temperature information and the operation result are transmitted is irrelevant. In other words, either one of the temperature information or the operation result may be set to be transmitted first.

In the method for operating a nonvolatile memory device in accordance with the embodiment, an operation to be performed by a nonvolatile memory device may be a write operation. The nonvolatile memory device may transmit an information on a write result of performing a write operation along with a temperature information to the controller. This may be performed based on a result information request command after the result information request command is received from the controller. An operation to be performed by the nonvolatile memory device may be a read operation, and the nonvolatile memory device may transmit read data along with a temperature information to the controller.

The method for operating a nonvolatile memory device in accordance with the embodiment may further include a step of receiving a first command (not shown), and a step of transmitting a temperature information along with an operation result to the controller each time when an operation command for the operation is received from a point of time when the first command is received (not shown). In other words, the first command may mean starting an operation of transmitting a temperature information measured in the nonvolatile memory device along with an operation result to the controller.

The method for operating a nonvolatile memory device in accordance with the embodiment may further include a step of outputting a second command by the controller (not shown). Transmitting a temperature information along with an operation result may be interrupted from a point of time when the second command is received. After an operation in which a temperature information is transmitted along with an operation result is started by the first command, the controller may output the second command, and the nonvolatile memory device may interrupt the operation in which a temperature information is transmitted along with an operation result, from a point of time when the second command is received. Namely, the second command may mean to interrupt transmitting a temperature information along with an operation result.

Figure 5:
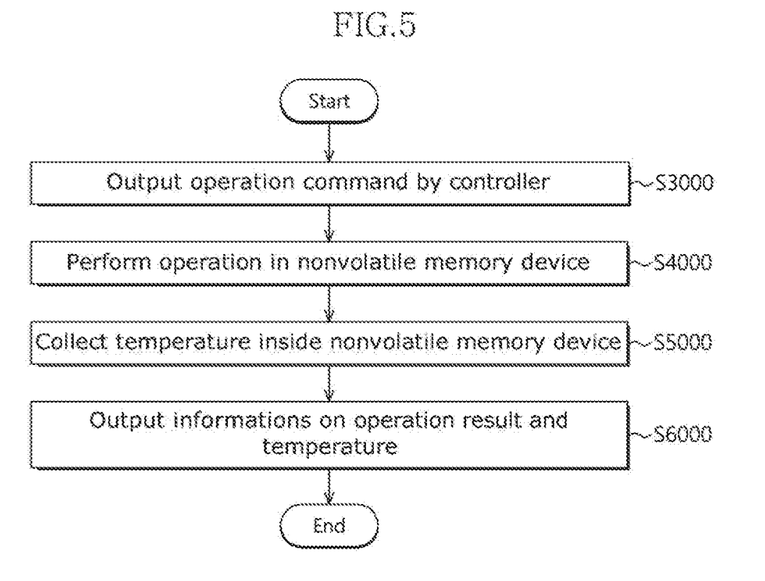
FIG. 5 is a flow chart describing a method for operating a data storage device in accordance with an embodiment.

FIG. 5 is a flow chart describing a method for operating a data storage device in accordance with an embodiment.

Referring to FIG. 5, the method for operating a data storage device in accordance with the embodiment may include a step of transmitting an operation command to a nonvolatile memory device by a controller at step S3000, a step of performing an operation in the nonvolatile memory device based on the operation command at step S4000, a step of collecting a temperature information inside the nonvolatile memory device at step S5000, and a step of transmitting an operation result along with the temperature information to the controller by the nonvolatile memory device at step S6000.

A step of performing an operation and steps of collecting a temperature information may be changed in order. That is, a temperature information may be collected first based on a temperature measured by a temperature sensor, and then, an operation may be performed. The fact that a temperature information measured by the temperature sensor may be transmitted "along with" an operation result to the controller may suggest that the temperature information and the operation result are successively transmitted. However, the order in which the temperature information and the operation result are transmitted is irrelevant. In other words, either one of the temperature information or the operation result may be set to be transmitted first.

In the method for operating a data storage device in accordance with the embodiment, an operation to be performed by a data storage device may be a write operation. The nonvolatile memory device may transmit an information on a write result of performing a write operation along with a temperature information to the controller. This may be performed based on a result information request command after the result information request command is received from the controller. An operation to be performed by the data storage device may be a read operation, and the nonvolatile memory device may transmit read data along with a temperature information to the controller.

Figure 6:
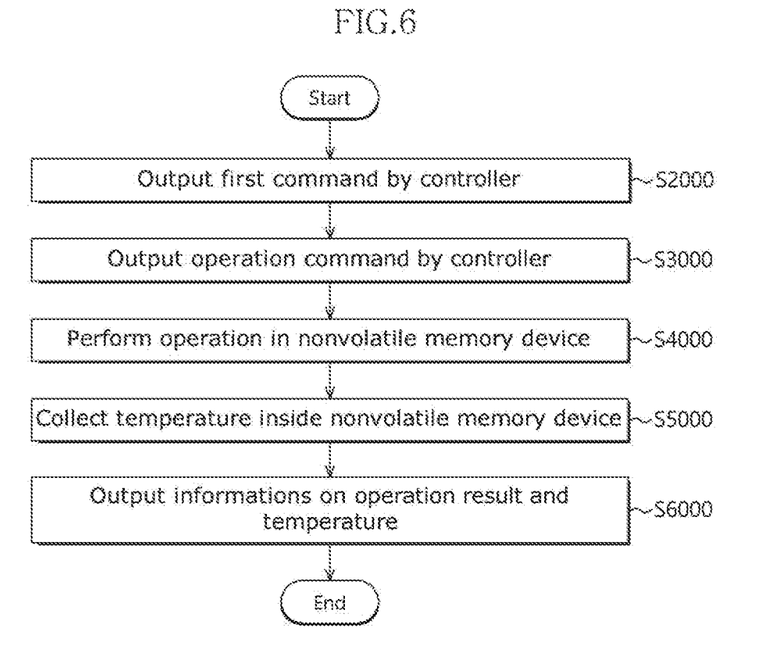
FIG. 6 is a flow chart describing a method for operating a data storage device in accordance with an embodiment.

FIG. 6 is a flow chart describing a method for operating a data storage device in accordance with an embodiment.

Referring to FIG. 6, the method for operating a data storage device in accordance with the embodiment may further include a step of outputting a first command by the controller at step S2000. The nonvolatile memory device may transmit a temperature information along with an operation result to the controller each time when an operation command is received from a point of time when the first command is received. The method for operating a data storage device in accordance with the embodiment may further include a step of outputting a second command by the controller (not shown). The nonvolatile memory device may interrupt transmitting a temperature information along with an operation result from a point of time when the second command is received.

In other words, the first command may mean starting an operation of transmitting a temperature information measured in the nonvolatile memory device along with an operation result to the controller. Further, after an operation in which a temperature information is transmitted along with an operation result is started by the first command, the controller may output the second command, and the nonvolatile memory device may interrupt the operation in which a temperature information is transmitted along with an operation result, from a point of time when the second command is received. Namely, the second command may mean a command to interrupt transmitting a temperature information along with an operation result.

Figure 7:
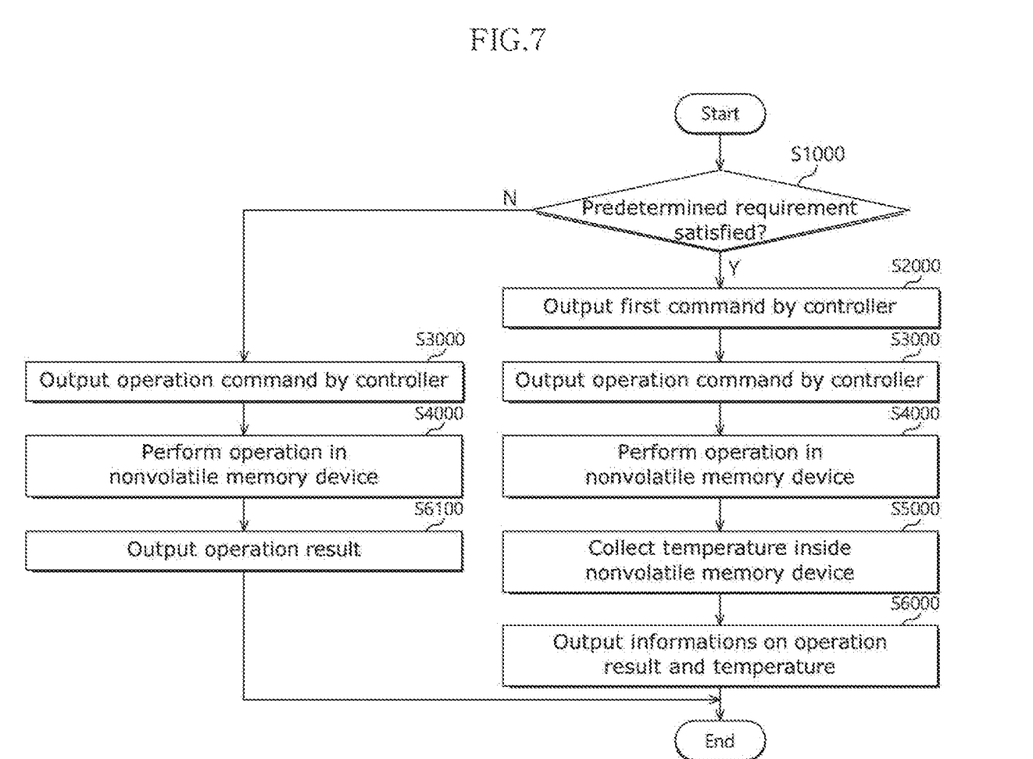
FIG. 7 is a flow chart describing a method for operating a data storage device in accordance with an embodiment.

FIG. 7 is a flow chart describing a method for operating a data storage device in accordance with an embodiment.

Referring to FIG. 7, in the method for operating a data storage device in accordance with the embodiment, when a predetermined requirement is satisfied (that is, 'Y' at step S1000), a first command may be outputted from a controller. Namely, the method may further include a step of determining whether a predetermined requirement is satisfied at step S1000.

In detail, a temperature inside the controller is measured, and, when the temperature inside the controller is equal to or higher than a reference temperature, the controller may output the first command. Moreover, a number of times by which commands are outputted to a nonvolatile memory device from the controller is counted, and, when the counted number of times is equal to or larger than a reference number of times, the controller may output the first command.

If a predetermined requirement is not satisfied (that is, 'N' at step S1000), steps of transmitting an operation command to a nonvolatile memory device by a controller at step S3000, performing an operation in the nonvolatile memory device in response to the operation command at step S4000, and outputting result of performing operation at step S6100 are performed.

Figure 8:
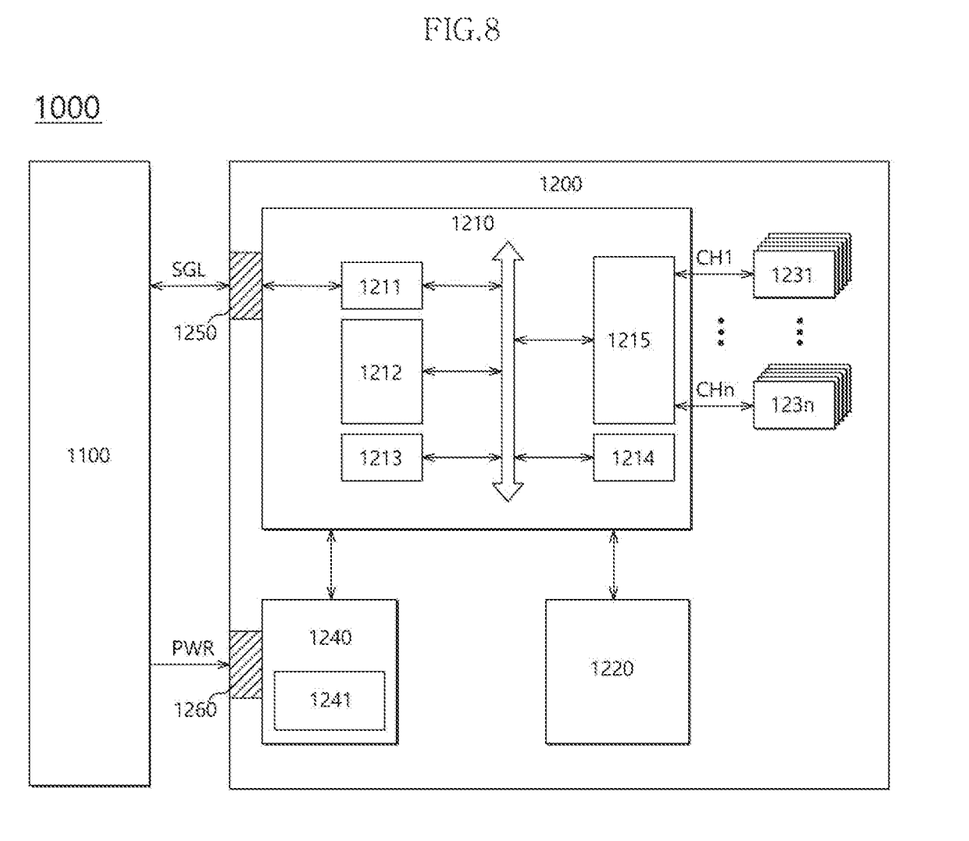
FIG. 8 is a diagram illustrating an example of a data processing system including a solid state drive in accordance with an embodiment.

FIG. 8 is a diagram illustrating an example of a data processing system including a solid state drive in accordance with an embodiment. Referring to FIG. 8, a data processing system 1000 may include a host device 1100 and a solid state drive (SSD) 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process a signal SGL inputted from the host device 1100. The control unit 1212 may control operations of internal function blocks according to a firmware or a software for driving the SSD 1200. The random access memory 1213 may be used as a working memory for driving such a firmware or software.

The error correction code (ECC) unit 1214 may generate the parity data of data to be transmitted to the nonvolatile memory devices 1231 to 123n. The generated parity data may be stored along with the data in the nonvolatile memory devices 1231 to 123n. The error correction code (ECC) unit 1214 may detect an error of the data read out from the nonvolatile memory devices 1231 to 123n, based on the parity data. If a detected error is within a correctable range, the error correction code (ECC) unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read out from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
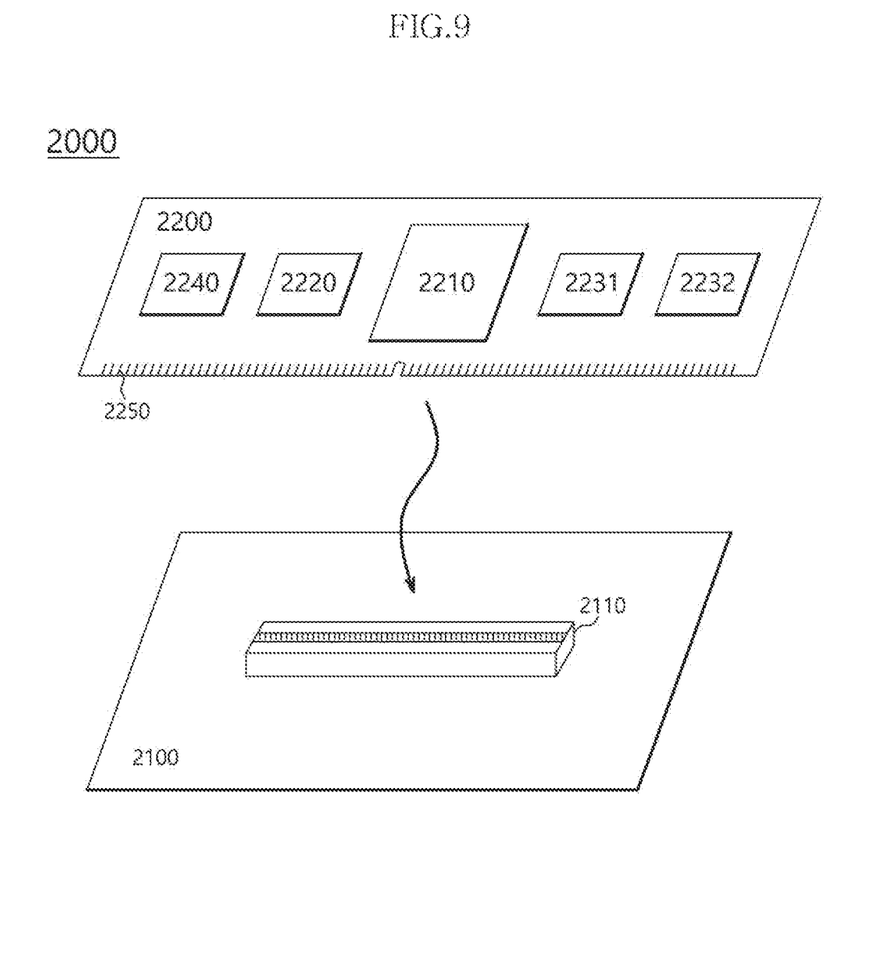
FIG. 9 is a diagram illustrating an example of a data processing system including a data storage device in accordance with an embodiment.

FIG. 9 is a diagram illustrating an example of a data processing system including a data storage device in accordance with an embodiment. Referring to FIG. 9, a data processing system 2000 may include a host device 2100 and a data storage device 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 10:
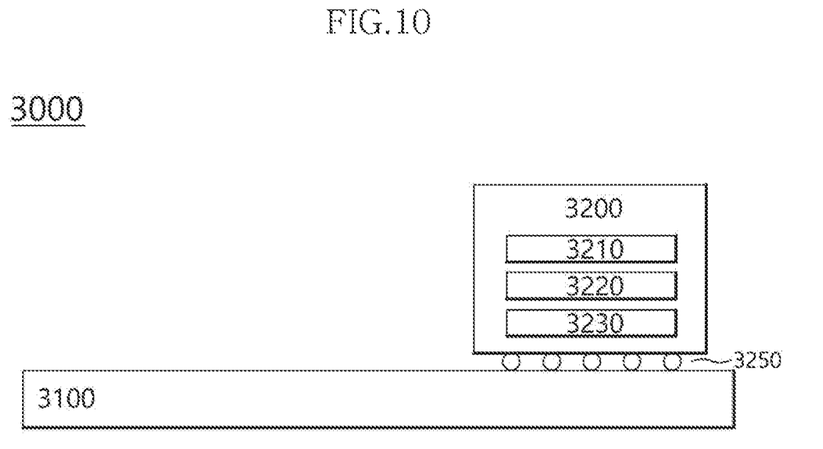
FIG. 10 is a diagram illustrating an example of a data processing system including a data storage device in accordance with an embodiment.

FIG. 10 is a diagram illustrating an example of a data processing system including a data storage device in accordance with an embodiment. Referring to FIG. 10, a data processing system 3000 may include a host device 3100 and a data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 8.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as a storage medium of the data storage device 3200.

Figure 11:
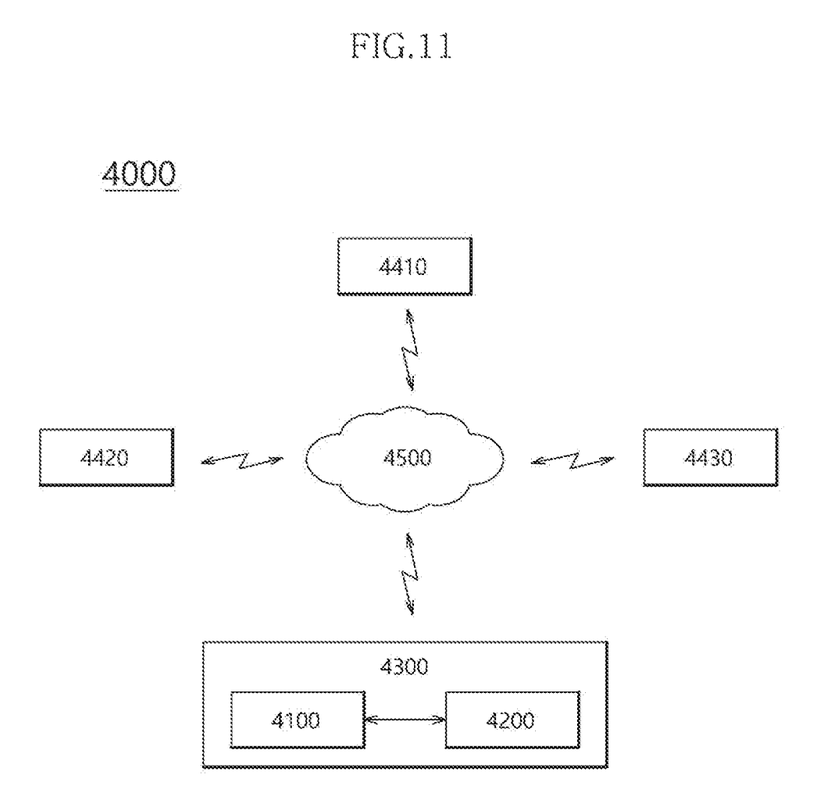
FIG. 11 is a diagram illustrating an example of a network system including a data storage device in accordance with an embodiment.

FIG. 11 is a diagram illustrating an example of a network system including a data storage device in accordance with an embodiment. Referring to FIG. 11, a network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and a data storage device 4200. The data storage device 4200 may be constructed by the data storage devices 100 shown in FIGS. 1 to 3, the SSD 1200 shown in FIG. 8, the data storage device 2200 shown in FIG. 9 or the data storage device 3200 shown in FIG. 10.

Figure 12:
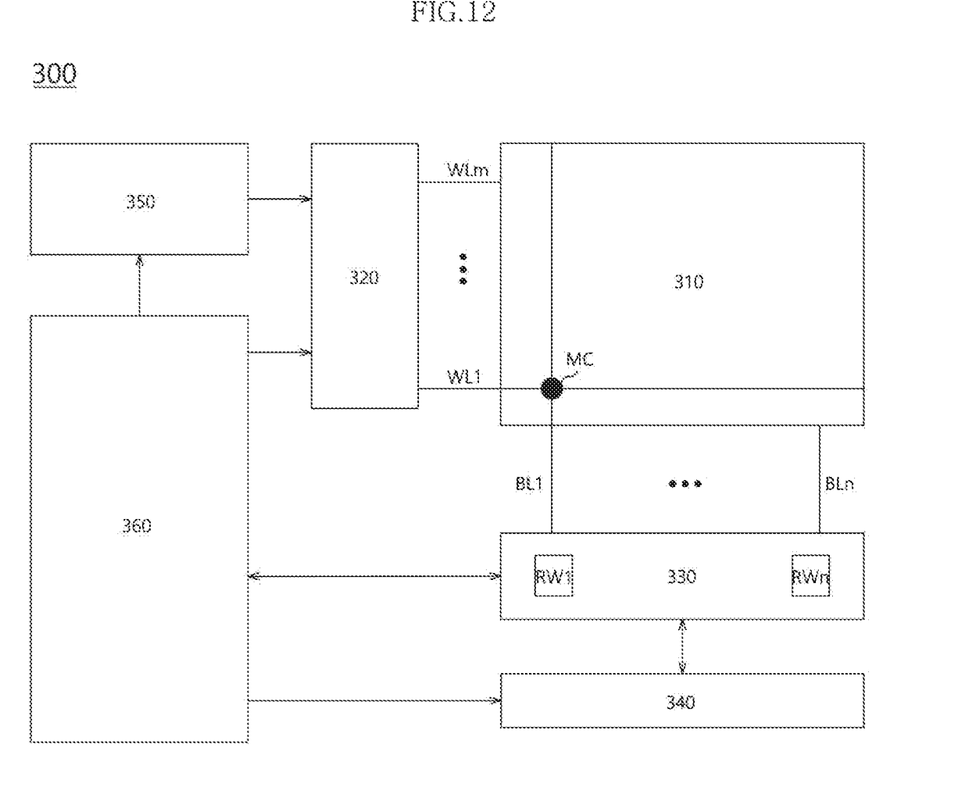
FIG. 12 is a block diagram illustrating an example of a nonvolatile memory device included in a data storage device in accordance with an embodiment.

FIG. 12 is a block diagram illustrating an example of a nonvolatile memory device included in a data storage device in accordance with an embodiment. Referring to FIG. 12, a nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to the control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to the control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For still another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control the read, write and erase operations of the nonvolatile memory device 300.

The descriptions for the above-described device may be applied to the methods in accordance with the embodiments of the present disclosure. Therefore, descriptions the same as the descriptions for the above-described device are omitted in the methods.

While various embodiments have been described above, it will be understood to those skilled in the art that the embodiments described are examples only. Accordingly, the data storage device, the operating method thereof and the method for operating a nonvolatile memory device described herein should not be limited based on the described embodiments.

What is claimed is:

1. A data storage device comprising:
 a nonvolatile memory device configured to have a temperature sensor; and
 a controller,
 wherein the nonvolatile memory device performs an operation based on an operation command outputted from the controller, and transmits a temperature information measured by the temperature sensor along with a result of the operation to the controller,
 wherein the controller outputs a first command to the nonvolatile memory at least one of when a temperature inside the controller is equal to or higher than a reference temperature and when a number of times by which commands are outputted to the nonvolatile memory device for a predetermined time is equal to or larger than a reference number of times.

2. The data storage device according to claim 1, wherein the operation is a write operation.

3. The data storage device according to claim 2, wherein the result of the operation includes an information on a result of writing data.

4. The data storage device according to claim 1, wherein the operation is a read operation.

5. The data storage device according to claim 4, wherein the result of the operation includes an information on a result of reading data.

6. The data storage device according to claim 1,
 wherein the nonvolatile memory device transmits the temperature information along with the result of the operation to the controller, each time when the operation command is received from a point of time when the first command is received.

7. The data storage device according to claim 6,
 wherein the controller outputs a second command, and
 wherein the nonvolatile memory device interrupts transmitting the temperature information along with the result of the operation, from a point of time when the second command is received.

8. A method for operating a nonvolatile memory device, comprising:
 receiving an operation command from a controller;
 performing an operation based on the operation command;
 collecting a temperature information based on a temperature measured by a temperature sensor;
 outputting a result of the operation and the temperature information together to the controller when a first command is inputted to the nonvolatile memory device from the controller,
 wherein the controller outputs the first command at least one of when a temperature inside the controller is equal to or higher than a reference temperature and when a number of times by which commands are outputted to the nonvolatile memory device for a predetermined time is equal to or larger than a reference number of times.

9. The method according to claim 8, wherein the operation is a write operation.

10. The method according to claim 9, wherein the result of the operation includes an information on a result of writing data.

11. The method according to claim 8, wherein the operation is a read operation.

12. The method according to claim 11, wherein the result of the operation includes an information on a result of reading data.

13. The method according to claim 8, further comprising:
transmitting the temperature information along with the operation result to the controller, each time when the operation command is received from a point of time when the first command is received.

14. The method according to claim 13, further comprising:
outputting a second command from the controller,
wherein transmitting the temperature information along with the operation result is interrupted from a point of time when the second command is received.

15. A method for operating a data storage device, comprising:
transmitting an operation command to a nonvolatile memory device from a controller;
performing an operation in the nonvolatile memory device based on the operation command;
collecting a temperature information inside the nonvolatile memory device; and
transmitting a result of the operation result and the temperature information together to the controller from the nonvolatile memory device when the nonvolatile memory device receives a first command;
wherein the first command is transmitted to the nonvolatile memory device from the controller at least one of when a temperature inside the controller is equal to or higher than a reference temperature and when a number of times by which commands are transmitted to the nonvolatile memory device for a predetermined time is equal to or larger than a reference number of times.

16. The method according to claim 15, further comprising:
outputting a first command from the controller,
wherein the nonvolatile memory device transmits the temperature information along with the result of the operation to the controller, each time when the operation command is received from a point of time when the first command is received.

17. The method according to claim 16, further comprising:
outputting a second command from the controller,
wherein the nonvolatile memory device interrupts transmitting the temperature information along with the result of the operation, from a point of time when the second command is received.

18. The method according to claim 16, further comprising:
counting a number of times by which commands are outputted from the controller to the nonvolatile memory device for a predetermined time.

* * * * *